United States Patent
Tsai et al.

(10) Patent No.: US 8,902,276 B2
(45) Date of Patent: Dec. 2, 2014

(54) COMPUTING DEVICE, STORAGE MEDIUM, AND METHOD FOR CONTROLLING MANIPULATION OF THE COMPUTING DEVICE

(75) Inventors: Hsueh-Tsen Tsai, New Taipei (TW); Hsiao-Ping Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 249 days.

(21) Appl. No.: 13/600,223

(22) Filed: Aug. 31, 2012

(65) Prior Publication Data

US 2013/0106981 A1    May 2, 2013

(30) Foreign Application Priority Data

Oct. 31, 2011   (TW) .................................. 100139662

(51) Int. Cl.
*H04N 7/15* (2006.01)
*H04M 3/56* (2006.01)
*H04N 7/14* (2006.01)
*H04L 12/18* (2006.01)

(52) U.S. Cl.
CPC .......... *H04L 12/1813* (2013.01); *H04M 3/567* (2013.01); *H04N 7/147* (2013.01); *H04L 12/1822* (2013.01)
USPC ................... 348/14.03; 348/14.1; 348/14.16; 348/207.99; 345/156

(58) Field of Classification Search
USPC ............ 348/14.03, 14.08, 14.09, 14.1, 16.16, 348/207.99; 345/156
See application file for complete search history.

(56) References Cited

U.S. PATENT DOCUMENTS

| | | | |
|---|---|---|---|
| 5,844,599 A * | 12/1998 | Hildin | 348/14.1 |
| 2002/0101512 A1* | 8/2002 | Klapman et al. | 348/207 |
| 2004/0082316 A1* | 4/2004 | Duran et al. | 455/412.1 |
| 2012/0133580 A1* | 5/2012 | Kirby et al. | 345/156 |
| 2013/0093838 A1* | 4/2013 | Tan et al. | 348/14.16 |

* cited by examiner

*Primary Examiner* — Joseph J Nguyen
(74) *Attorney, Agent, or Firm* — Novak Druce Connolly Bove + Quigg LLP

(57) ABSTRACT

A method controls manipulation of a computing device. The method turns on a camera device to capture images and gestures of a manipulation owner, analyzes the gestures to get operations to control the computing device using a recognition unit of the computing device, and determines whether an additional participant gets the manipulation control of the computing device. If the additional participant gets the manipulation control of the computing device, the method stops to capture the images of the manipulation owner, and captures the images of the additional participant. If the additional participant does not get the manipulation control of the computing device, the method still captures the images of the manipulation owner.

18 Claims, 4 Drawing Sheets

COMPUTING DEVICE, STORAGE MEDIUM, AND METHOD FOR CONTROLLING MANIPULATION OF THE COMPUTING DEVICE

BACKGROUND

1. Technical Field

Embodiments of the present disclosure relate to remote control systems and methods, and more particularly to a computing device, a storage medium, and a method for controlling manipulation of the computing device.

2. Description of Related Art

A computing device can connect to one or more remote devices through a network in a remote meeting mode. A user of the computing device can control the computing device, for example, to share documents to participants in the remote meeting mode, or operate the documents to open, close, or turn pages of the documents, for example. However, the participants except the user in the remote meeting mode cannot control the computing device. That is, it is inconvenient for the participants in the remote meeting mode to have an interactive communication.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of a non-transitory computer-readable medium include CDs, DVDs, flash memory, and hard disk drives.

Figure 1:
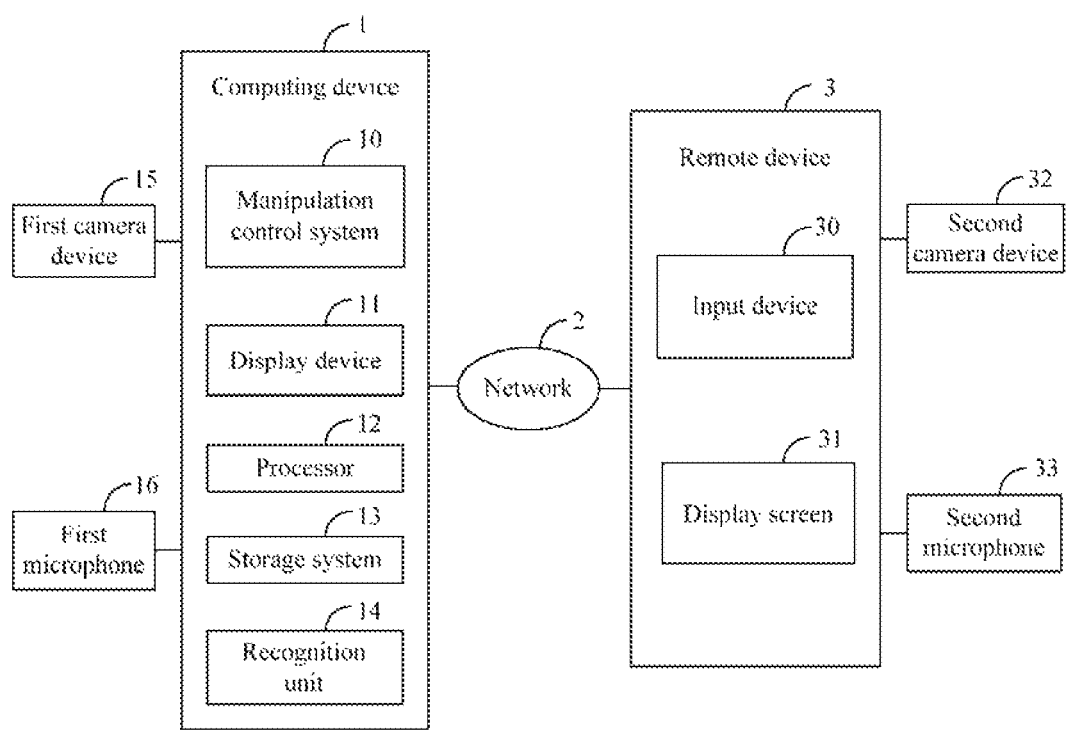
FIG. 1 is a block diagram of one embodiment of a computing device including a manipulation control system.

FIG. 1 is a block diagram of one embodiment of a computing device 1 including a manipulation control system 10. The computing device 1 electronically connects to one or more remote devices 3 through a network 2. As shown in FIG. 1, the computing device 1 is only electronically connected to one remote device 3. The network 2 may be an Internet, an intranet, an ethernet, or any other relevant network. The remote device 3 may be a computer, a mobile phone, or any other terminal electronic device. In one embodiment, the computing device 1 and the remote devices 3 constitute a remote meeting mode. In the remote meeting mode, the computing device 1 is in a main meeting room, and the remote device 3 is in a remote meeting room. The main meeting room may have one or more participants using the computing device 1, and the remote meeting room also may have one or more participants using the remote device 3. The manipulation control system 10 may allow all of the participants to control the computing device 1. The participant who controls the computing device 1 is called as a manipulation owner.

The computing device 1 further includes a display device 11, a processor 12 and a storage system 13. The display device 11 displays documents and other data to the participants. The processor 12 executes one or more computerized codes and other applications for the computing device 1, to provide functions of the manipulation control system 10. The storage system 13 stores the documents and other data. In one embodiment, the storage system 13 may be an internal storage device, such as a random access memory (RAM) for temporary storage of information, and/or a read only memory (ROM) for permanent storage of information. In some embodiments, the storage system 13 may also be an external storage device, such as an external hard disk, a storage card, or a data storage medium.

The computing device 1 also electronically connects to at least one first camera device 15 and at least one first microphone 16. The first microphone 16 is a microphone that receives voice signals of the participants in the main meeting room. The first camera device 15 may be a digital camera that captures images of the manipulation owner in the main meeting room. The manipulation owner can use a keyboard, a mouse, or gestures to control the computing device 1. The computing device 1 further includes a recognition unit 14 that can analyze the gestures to control the documents.

The remote device 3 includes, but is not limited to, an input device 30 and a display screen 31. The input device 30 may be a mouse, a keyboard, or a remote controller to operate the documents. The display screen 31 displays the same documents as the display device 11. The remote device 3 further connects to at least one second camera device 32 and at least one second microphone 33. The second camera device 32 may be a digital camera that captures images of the manipulation owner in the remote meeting room. The second microphone 33 is a microphone that receives voice signals of the participants in the remote meeting room.

Figure 4:
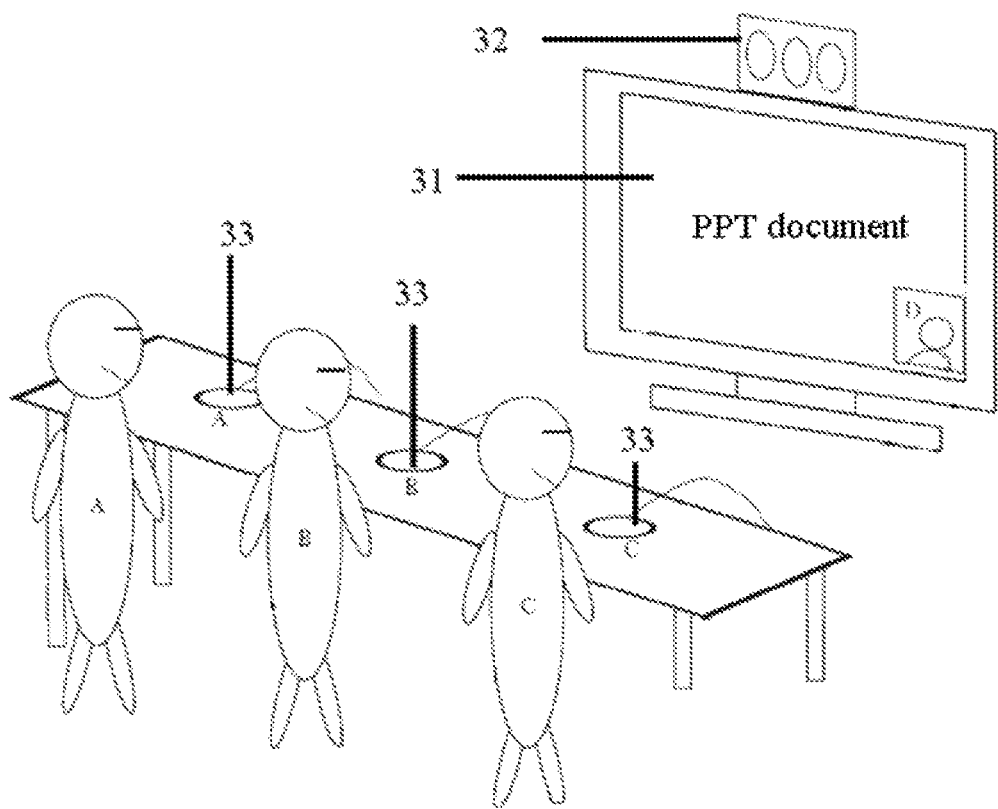
FIG. 4 illustrates an example of a remote meeting room of a remote device in a remote meeting mode.

In one embodiment, each of the first camera devices 15 and the second camera devices 32 may comprise two types, where both of the first camera devices 15 and the second camera devices 32 may be a fixed camera and a mobile camera. Each of the fixed cameras corresponds to a microphone, as shown in FIG. 4. In one embodiment, if the first microphone 16 receives voice signals, the fixed camera captures images of the participant that uses the first microphone 16, and sends the images to the display device 11 of the computing device 1. The participant of the main meeting room who uses the first microphone 16 is the manipulation owner of the computing device 1. If the second microphone 33 receives voice signals, the fixed camera captures images of the participant that uses the second microphone 33, and sends the images to the display screen 31 of the remote device 3. The participant of the remote meeting room who uses the second microphone 33 is the manipulation owner of the computing device 1.

If the first camera device 15 is a mobile camera, the main meeting room only has one mobile camera, and the mobile camera in the main meeting room corresponds to one or more first microphones 16. When the first microphone 16 receives voice signals of the participants, the manipulation control system 10 can locate the position of the first microphone 16 according to a position relation. The position relation is a relation distance and angle between the first microphone 16 and the mobile camera, or the second microphone 33 and the mobile camera. If the second camera device 32 is a mobile camera, the remote meeting room only has one mobile camera, and the mobile camera in the remote meeting room corresponds to one or more second microphones 33. When the second microphone 33 receives voice signals of the participants, the manipulation control system 10 can locate the position of the second microphone 33 according to the position relation.

Figure 2:
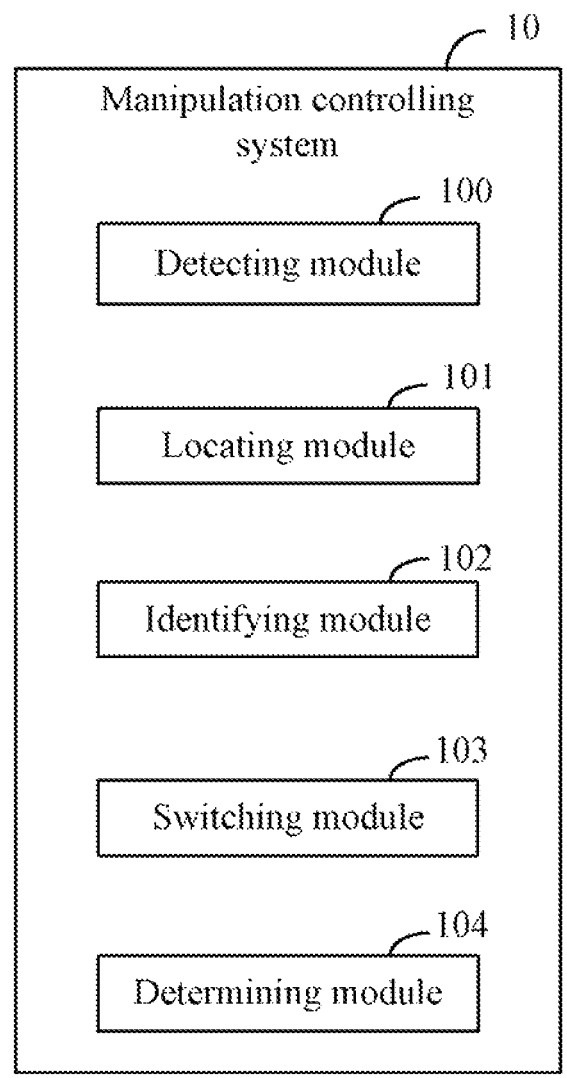
FIG. 2 is a block diagram of function modules of the manipulation control system in the computing device of FIG. 1.

FIG. 2 is a block diagram of function modules of the manipulation control system 10 in the computing device 1 of FIG. 1. In one embodiment, the manipulation control system 10 may include a detecting module 100, a locating module 101, an identifying module 102, a switching module 103, and a determining module 104. The modules 100-104 comprise computerized codes in the form of one or more programs that are stored in the storage system 13 and executed by the processor 12 to provide functions for the modules. Details of each of the modules are given in FIG. 3.

Figure 3:
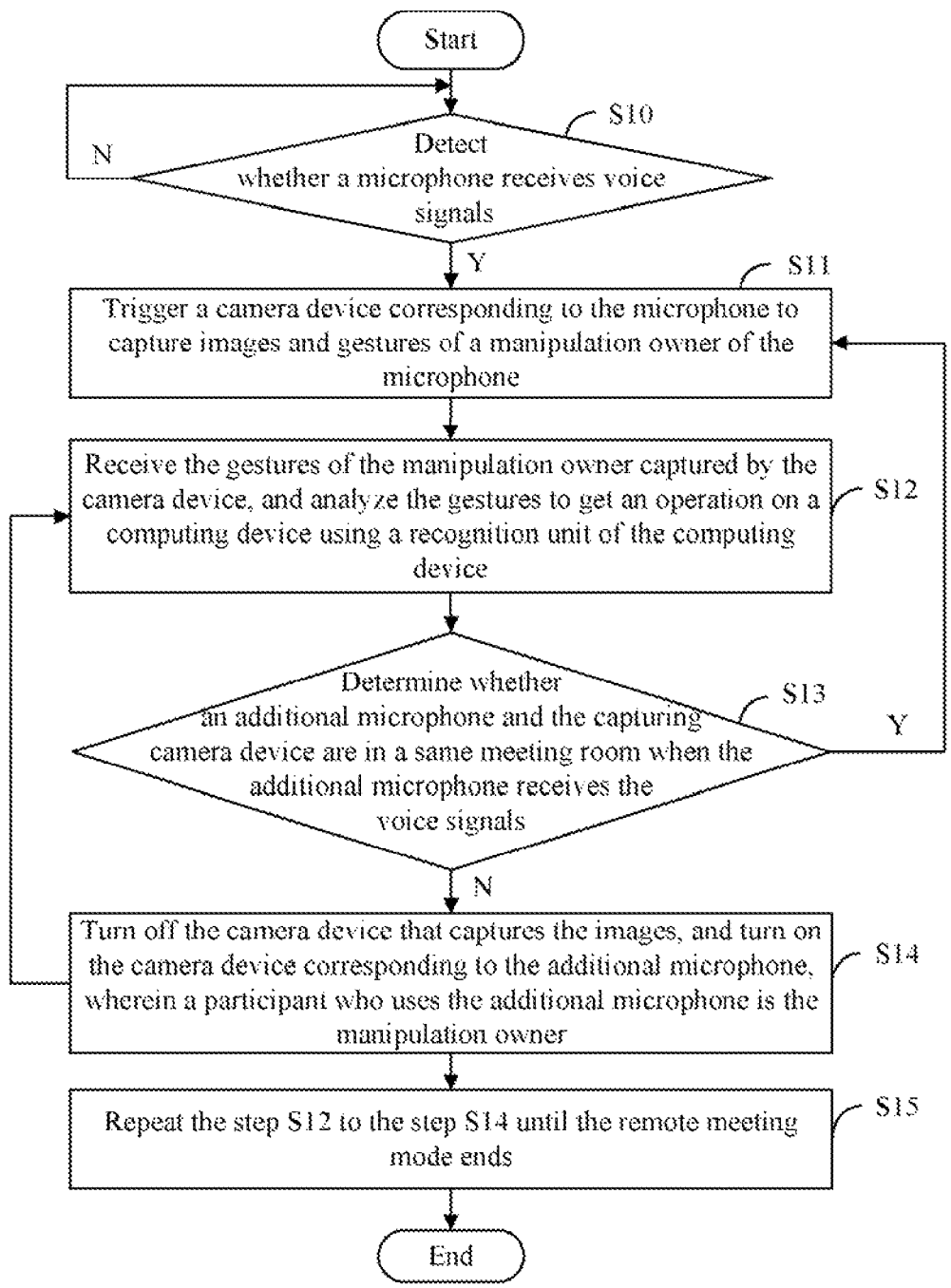
FIG. 3 is a flowchart of one embodiment of a method for controlling manipulation of the computing device of FIG. 1.

FIG. 3 is a flowchart of one embodiment of a method for controlling manipulation of the computing device 1 of FIG. 1. Depending on the embodiment, additional steps may be added, others removed, and the ordering of the steps may be changed.

In step S10, the detecting module 100 detects whether one of the first microphones 16 receives voice signals when the computing device 1 and the remote device 3 are connected via a remote meeting mode. If one of the first microphones 16 receives voice signals, step S11 is implemented. Otherwise, if none of first microphones 16 receives voice signals, step S10 is repeated.

In step S11, the locating module 101 triggers one of the first camera devices 15 corresponding to the received first microphone 16 to capture images and gestures of a participant who uses the received first microphone 16. In one embodiment, the participant who uses the received first microphone 16 gets the manipulation of the computing device 1, and becomes the manipulation owner of the computing device 1.

In one embodiment, the first camera device 15 may be a fixed camera, or a mobile camera. When the first camera device 15 is a mobile camera, the locating module 101 locates the position of the received first microphone 16 according to a position relation. The position relation is a relation distance and angle between the received first microphone 16 and the mobile camera.

When the first camera device 15 is a fixed camera, the switching module 103 turns off the fixed camera that captures the images, and turns on the fixed camera corresponding to the received first microphone 16. If the manipulation of the computing device 1 does not get by the participants, the switching module 103 just turns on the fixed camera corresponding to the received first microphone 16.

In step S12, the identifying module 102 receives the images and gestures of the manipulation owner that captured by the first camera device 15, sends images to the display device 11 of the computing device 1, and analyzes the gestures to get an operation on the computing device 1 using the recognition unit 14. In one embodiment, the operation may open documents, close documents, or turn pages of the documents, for example. The manipulation owner also can operate the documents by using a mouse, a keyboard, or a remote controller of the computing device 1. The document may be a POWERPOINT document, a WORD document, or slides. The display screen 31 of the remote device 3 displays the same contents as the display device 11.

In step S13, the determining module 104 determines whether an additional microphone and the first camera device 15 are in the same meeting room when the additional microphone receives voice signals is detected by the detecting module 100. If the additional microphone and the first camera device 15 are in the same meeting room, the determining module 104 replaces the additional microphone to the received first microphone 16, and step S11 is repeated. If the additional microphone and the first camera device 15 are not in the same meeting room, step S14 is implemented. In one embodiment, the additional microphone is another microphone except the received first microphone 16 in the remote meeting mode, may be a second microphone 33 in the remote meeting room, for example.

In step S14, the switching module 103 turns off the first camera device 15 through the network 2, turns on the second camera device 32 corresponding to the additional microphone, and replaces the second camera device 32 to the first camera device 15. In one embodiment, if the second camera device 32 is a mobile camera, the locating module 101 needs to locate the position of the additional microphone according to the position relation. The participant who uses the additional microphone becomes the manipulation owner of the computing device 1.

In step S15, the switching module 103 repeats to implement step S12 to step S14 until the remote meeting mode ends.

FIG. 4 illustrates an example of a remote meeting room of a remote device in a remote meeting mode. The display device 11 and the display screen 31 display the same contents in the remote meeting mode. As shown in FIG. 4, the display screen 31 displays a POWERPOINT document (e.g., a presentation), and a picture of the manipulation owner D in the lower right corner. The remote meeting room has three fixed cameras, and each of the fixed cameras corresponds to the second microphone 33 and a participant of the remote meeting room.

If a participant B talks in the reporting process of the manipulation owner D, the second microphone 33 receives the voice signals of the participant B. The switching module 103 turns off the camera device corresponding to the manipulation owner D, and turns on the second camera device 32 corresponding to the participant B. The second camera device 32 corresponding to the participant B captures the images and gestures of the participant B, sends the images to the display device 11 of the computing device 1 in the remote meeting mode. The recognition unit 14 analyzes the gestures to control the computing device 1.

In one embodiment, the above-described steps are implemented in an open manipulation status. The open manipulation status is a status that the participant can get the manipulation of the computing device 1 directly without the permission of the manipulation owner. If the computing device 1 is not in the open manipulation status, and the manipulation of the computing device 1 needs to be switched, it needs the permission of the manipulation owner to switch the manipulation.

The manipulation of the computing device 1 is only controlled by a participant in the remote meeting mode. Other participants do not have the manipulation to control the computing device 1. It is not convenient for the participants to have an interactive communication in the remote meeting mode. However, with the present manipulation controlling system 10, the voice signal may trigger the corresponding participant to have the manipulation of the computing device 1. All participants may have the manipulation to control the computing device 1, and have a good interactive communication.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method of a computing device for controlling manipulation of the computing device, the method comprising:
   (a) detecting whether a microphone receives voice signals when the computing device and a remote device are connected via a remote meeting mode;
   (b) triggering a camera device corresponding to the microphone to capture images and gestures of a manipulation owner of the microphone;
   (c) receiving the gestures of the manipulation owner captured by the camera device, and analyzing the gestures to get an operation on the computing device using a recognition unit of the computing device;
   (d) determining whether an additional microphone and the capturing camera device are in a same meeting room when the additional microphone receives the voice signals;
   (e) triggering a camera device corresponding to the additional microphone to capture images of the manipulation owner, if the additional microphone and the capturing camera device are in the same meeting room;
   (f) turning off the camera device that captures the images, and turning on the camera device corresponding to the additional microphone, if the additional microphone and the capturing camera device are not in the same meeting room, wherein a participant who uses the additional microphone is the manipulation owner; and
   (g) repeating the step (c) to the step (f) until the remote meeting mode ends.

2. The method as claimed in claim 1, wherein the remote meeting mode includes a main meeting room and one or more remote meeting rooms.

3. The method as claimed in claim 2, wherein the main meeting room and each of the remote meeting rooms are equipped with one or more camera devices and microphones.

4. The method as claimed in claim 3, wherein each of the camera devices is a fixed camera or a mobile camera, each of the fixed cameras corresponds to a microphone if the camera device is the fixed camera, and each of the mobile cameras corresponds to one or more microphones if the camera device is the mobile camera.

5. The method as claimed in claim 4, wherein the step (b) further comprises:
   locating a position of the microphone according to a position relation if the camera device is the mobile camera, wherein the position relation is a relation distance and angle between the microphone and the mobile camera; and
   turning off the fixed camera that captures the images and turning on the fixed camera corresponding to the microphone, if the camera device is the fixed camera.

6. The method as claimed in claim 4, wherein the step (f) further comprises:
   locating a position of the additional microphone according to the position relation if the camera device is the mobile camera.

7. A non-transitory computer readable storage medium storing a set of instructions, when executed by at least one processor of a computing device, cause the at least one processor to perform a method for controlling manipulation of the computing device, the method comprising:
   (a) detecting whether a microphone receives voice signals when the computing device and a remote device are connected via a remote meeting mode;
   (b) triggering a camera device corresponding to the microphone to capture images and gestures of a manipulation owner of the microphone;
   (c) receiving the gestures of the manipulation owner captured by the camera device, and analyzing the gestures to get an operation on the computing device using a recognition unit of the computing device;
   (d) determining whether an additional microphone and the capturing camera device are in a same meeting room when the additional microphone receives the voice signals;
   (e) triggering a camera device corresponding to the additional microphone to capture images of the manipulation owner, if additional microphone and the capturing camera device are in the same meeting room;
   (f) turning off the camera device that captures the images, and turning on the camera device corresponding to the additional microphone, if the additional microphone and the capturing camera device are not in the same meeting room, wherein a participant who uses the additional microphone is the manipulation owner; and
   (g) repeating the step (c) to the step (f) until the remote meeting mode ends.

8. The storage medium as claimed in claim 7, wherein the remote meeting mode includes a main meeting room and one or more remote meeting rooms.

9. The storage medium as claimed in claim 8, wherein the main meeting room and each of the remote meeting rooms are equipped with one or more camera devices and microphones.

10. The storage medium as claimed in claim 9, wherein each of the camera devices is a fixed camera or a mobile camera, each of the fixed cameras corresponds to a microphone if the camera device is the fixed camera, and each of the mobile cameras corresponds to one or more microphones if the camera device is the mobile camera.

11. The storage medium as claimed in claim 10, wherein the step (b) further comprises:
   locating a position of the microphone according to a position relation if the camera device is the mobile camera, wherein the position relation is a relation distance and angle between the microphone and the mobile camera; and
   turning off the fixed camera that captures the images and turning on the fixed camera corresponding to the microphone, if the camera device is the fixed camera.

12. The storage medium as claimed in claim 10, wherein the step (f) further comprises:
   locating the position of the additional microphone according to the position relation if the camera device is the mobile camera.

13. A computing device, comprising:
   a storage device;
   at least one processor; and
   one or more programs that are stored in the storage device and executed by the at least one processor, the one or more programs comprising:
   a detecting module that detects whether a microphone receives voice signals when the computing device and a remote device are connected via a remote meeting mode;

a locating module that triggers a camera device corresponding to the microphone to capture images and gestures of a manipulation owner of the microphone;

an identifying module that receives the gestures of the manipulation owner captured by the camera device, and analyzes the gestures to get an operation on the computing device using a recognition unit of the computing device;

a determining module that determines whether an additional microphone and the capturing camera device are in a same meeting room when the additional microphone receives the voice signals; and a switching module that turns off the camera device that captures the images, and turns on the camera device corresponding to the additional microphone, if the additional microphone and the capturing camera device are not in the same meeting room, wherein a participant who uses the additional microphone is the manipulation owner.

14. The computing device as claimed in claim 13, wherein the remote meeting mode includes a main meeting room and one or more remote meeting rooms.

15. The computing device as claimed in claim 14, wherein the main meeting room and each of the remote meeting rooms are equipped with one or more camera devices and microphones.

16. The computing device as claimed in claim 15, wherein each of the camera devices is a fixed camera or a mobile camera, each of the fixed cameras corresponds to a microphone if the camera device is the fixed camera, and each of the mobile cameras corresponds to one or more microphones if the camera device is the mobile camera.

17. The computing device as claimed in claim 16, wherein the locating module further locates a position of the microphone according to a position relation if the camera device is the mobile camera, wherein the position relation is a relation distance and angle between the microphone and the mobile camera.

18. The computing device as claimed in claim 16, wherein the switching module further turns off the fixed camera that captures the images and turns on the fixed camera corresponding to the microphone, if the additional microphone and the capturing camera device are in the same meeting room and the camera device is the fixed camera.

* * * * *